US008079510B2

(12) United States Patent
Vandermeulen et al.

(10) Patent No.: US 8,079,510 B2
(45) Date of Patent: Dec. 20, 2011

(54) INFORMATION ON CONSUMABLES

(75) Inventors: Kris Vandermeulen, Bornem (BE); Jos Vleurinck, Oordegem (BE); Geert Heyse, Sint-Katelijne-Waver (BE)

(73) Assignee: DYMO, Sint-Niklaas (BE)

(*) Notice: Subject to any disclaimer, the term of this patent is extended or adjusted under 35 U.S.C. 154(b) by 1145 days.

(21) Appl. No.: 10/540,750

(22) PCT Filed: Dec. 23, 2003

(86) PCT No.: PCT/EP03/14991

§ 371 (c)(1), (2), (4) Date: May 15, 2006

(87) PCT Pub. No.: WO2004/058509

PCT Pub. Date: Jul. 15, 2004

(65) Prior Publication Data

US 2006/0238600 A1 Oct. 26, 2006

(30) Foreign Application Priority Data

Dec. 24, 2002 (GB) .................................. 0230199.2

(51) Int. Cl.
*G06F 17/00* (2006.01)

(52) U.S. Cl. ........................................................ 235/375

(58) Field of Classification Search .................. 235/375, 235/494; 347/177, 53, 111

See application file for complete search history.

(56) References Cited

U.S. PATENT DOCUMENTS 5,492,420 A 2/1996 Nunokawa et al.
5,599,119 A 2/1997 Nunokawa et al.
5,605,404 A 2/1997 Nunokawa et al.
5,634,728 A 6/1997 Nunokawa et al.
5,752,777 A 5/1998 Nunokawa et al.
5,765,954 A 6/1998 Nunokawa et al.
5,821,975 A 10/1998 Gunther et al.
5,887,993 A 3/1999 Nunokawa et al.
5,934,812 A 8/1999 Nunokawa et al.
5,961,225 A 10/1999 Nunokawa et al.
5,967,678 A 10/1999 Nunokawa et al.

(Continued)

FOREIGN PATENT DOCUMENTS

CN 1087583 A 6/1994

(Continued)

OTHER PUBLICATIONS

International Search Report dated Apr. 14, 2004.

(Continued)

*Primary Examiner* — Seung Lee

(74) *Attorney, Agent, or Firm* — Marshall, Gerstein & Borun LLP

(57) ABSTRACT

A printing apparatus using a consumable providing at least one of an image receiving tape, the consumable carrying a tag holding parameter information identifying the width of the tape and status information including the amount of tape remaining in the consumable, the printing apparatus comprising: printing means for printing an image; a tag reader arranged to receive said information from the tag via a contactless link in the form of electromagnetic waves; and a processor arranged to (i) receive said information and to control operation of the printing apparatus in dependence thereon including selecting a printing operation based on the identified width, and (ii) update the status information based on usage of the tape via the contactless link.

16 Claims, 12 Drawing Sheets

U.S. PATENT DOCUMENTS

| | | | | |
|---|---|---|---|---|
| 5,997,194 | A | 12/1999 | Nunokawa et al. | |
| 6,012,860 | A | 1/2000 | Nunokawa et al. | |
| 6,106,171 | A | 8/2000 | Nunokawa et al. | |
| 6,149,325 | A | 11/2000 | Nunokawa et al. | |
| 6,364,552 | B1 | 4/2002 | Nehowig et al. | |
| 6,802,659 | B2 * | 10/2004 | Cremon et al. | 400/76 |
| 2001/0000222 | A1 | 4/2001 | Miyazaki et al. | |
| 2002/0113120 | A1 | 8/2002 | Yajima | |
| 2003/0077098 | A1 | 4/2003 | Nunokawa et al. | |

FOREIGN PATENT DOCUMENTS

| | | | |
|---|---|---|---|
| EP | 1 060 895 | A1 | 12/2000 |
| EP | 1 066 969 | A2 | 1/2001 |
| EP | 0 592 198 | B1 | 4/2002 |
| EP | 1 211 081 | A2 | 6/2002 |
| EP | 1 258 366 | A1 | 11/2002 |
| JP | 7-156499 | A | 6/1995 |
| JP | 11-198467 | | 7/1999 |
| JP | 2000-281268 | A | 10/2000 |
| JP | 2001-038986 | | 2/2001 |
| JP | 2002-251673 | | 9/2002 |
| WO | 98/05508 | | 2/1998 |
| WO | WO-98/52762 | A2 | 11/1998 |
| WO | WO 02/053389 | A1 | 7/2002 |

OTHER PUBLICATIONS

Notification of the First Office Action for Chinese Application No. 200380109259.X, dated Apr. 27, 2001.

Translation of Japanese Office Action in corresponding application JP 2004-563226.

English-language translations of Interrogatory for Japanese Patent Application No. 2009-10606, dated Apr. 13, 2010.

Search Report for Application No. GB0230199.2, dated Dec. 3, 2003.

* cited by examiner

INFORMATION ON CONSUMABLES

CROSS REFERENCE TO RELATED APPLICATIONS

This is the U.S. National Stage of PCT/EP2003/014991, filed Dec. 23, 2003, which in turn claims priority to European Patent Application No. 0230199.2, filed Dec. 24, 2002, both of which are incorporated herein by reference in their entireties.

FIELD OF THE INVENTION

The present invention relates to the provision of information on consumables in the context of thermal printers.

BACKGROUND

Thermal printers are widely known and generally comprises a printing means comprising a thermally activatable printhead for printing onto an image receiving tape. Typically, the image receiving tape has an upper layer for receiving an image and a removable liner layer or backing layer secured to the upper layer by a layer of adhesive, such that after an image has been printed the liner layer or backing layer can be removed and the image receiving tape can be stuck down in the form of a label. Such thermal printers include cutters for cutting off a length of image receiving tape after the image has been printed. Such thermal printers operate with a consumable in the form of image receiving tape, or any other image receiving substrate such as heat-shrink tubes, magnetic, iron-on labels, plastic strips, etc.

In addition, the printer can utilise an ink ribbon cassette which supplies ink ribbon in overlap with the image receiving tape at the printhead.

The term "consumable" is used herein to denote any appropriate form of providing image receiving tape or image transferring substance. A number of forms of consumables are known in the art, including cassettes which comprise a housing in which is located a supply of image receiving tape. Cassettes are generally usable once only, such that once the image receiving tape has been consumed, the cassette (including the housing) is thrown away.

Another type of consumable is a holder, which comprises a spool around which image receiving tape is wound. The spool may or may not be driven, and generally comprises a plastic component.

Another type of consumable is a roll of tape without a permanent holder, for example wound on a paper core. These are termed "supplies".

As already mentioned, in thermal printers, an image is generally generated by activation of a thermal printhead against an ink ribbon cassette, such that ink from the ink ribbon is transferred onto the image receiving tape at a print zone. So-called direct thermal tapes are also available, in which an image is created directly onto the direct thermal tape without the interposition of an ink ribbon cassette. The term "consumable" also encompasses ink ribbon or other thermal transfer materials.

It is known in the art to provide a consumable, mostly a cassette, which has means for identifying parameters of the image receiving tape inside the cassette. For example, the cassette may identify the width of the image receiving tape, the nature of the image receiving tape (for example its material properties, thermal transfer, direct thermal etc.) or other tape parameters. It is also known to use these parameters in controlling certain operations of printing apparatus. For example, the width of the tape can be detected and the size of characters to be printed can be adjusted accordingly.

A piece of information which is particularly interesting is the amount of tape which is remaining which can be used for printing each time a consumable is inserted into a thermal printing apparatus. It is an aim of the present invention to allow such information to be held at a consumable in a convenient and secure manner.

Reference is made to U.S. Pat. No. 5,821,975 (Francotyp-Postalia AG & Co.) which relates to a franking machine. In particular, that patent discloses that an ink ribbon cassette can have a memory (optical, magnetic or electronic) which holds information relating to the degree of usage of the ink ribbon. Reference is also made to WO98/05508 which uses an RF tag in the context of adapting a transfer ribbon and a receiver material. Nothing in these documents relates to the problem of updating status information associated with an image receiving tape.

Reference is also made to EP-A-1066969 (Brady Worldwide, Inc.) which describes a system where the consumable comprises a plurality of pre-cut labels secured by adhesive to a label web. An inventory of labels is read from a memory device associated with the labelling medium supply spool. After each label is printed, the inventory of labels is altered by writing data to the memory device. Therefore, the inventory of labels indicates how many labels have been used, and therefore how many labels are remaining assuming that the initial number of labels on the web is known. This requires a memory chip associated with the labelling medium.

Reference is also made to U.S. Pat. No. 5,605,404 (Seiko Epson). This document discloses a tape cartridge cooperable with a thermal printer, the tape cartridge having a one chip microprocessor which holds information about the tape in the tape cartridge. In particular, the microprocessor can hold information including a residual amount of tape in the tape cartridge, a code representing a user, a consumed amount of tape and/or a password. The microprocessor can be updated to indicate the amount of tape left in the tape cartridge by determining the used tape length by counting the number of steps of the stepping motor.

This device however requires the use of a microprocessor at the tape cartridge, which increases the cost of the tape cartridge. Moreover, electrical connections are required for the microprocessor.

SUMMARY OF THE INVENTION

According to one aspect of the present invention there is provided a printing apparatus using a consumable providing at least one of an image receiving tape, the consumable carrying a tag holding parameter information identifying the width of the tape and status information including the amount of tape remaining in the consumable, the printing apparatus comprising: printing means for printing an image; a tag reader arranged to receive said information from the tag via a contactless link in the form of electromagnetic waves; and a processor arranged to (i) receive said information and to control operation of the printing apparatus in dependence thereon including selecting a printing operation based on the identified width, and (ii) update the status information based on usage of the tape via the contactless link.

Another aspect of the invention provides in combination, a printing apparatus and a consumable providing image receiving tape having a tag holding parameter information identifying the width of the tape and status information including the amount of tape remaining in the consumable, the printing apparatus comprising: printing means for printing an image;

a tag reader arranged to read said information from the tag on the consumable via a contactless link in the form of electromagnetic waves; and a processor arranged to (i) receive said: information and to control operation of the printing apparatus in dependence thereon including selecting a printing operation based on the identified width, and (ii) update the status information based on usage of the tape via the contactless link.

Another aspect of the invention provides a consumable providing an image receiving substrate which carries markings allowing tape usage to be monitored and carrying a tag holding status information identifying the length of image receiving tape remaining for receiving an image, the consumable having a transmitter for transmitting the information via a contactless link in the form of electromagnetic waves, and a receiver for updating the status information.

The use of a tag on the consumable which transmits information via a contactless link, e.g. RF waves, has a number of advantages over a memory chip or microprocessor. It is particularly advantageous where the consumable is a tape supply itself, where it would not be possible to use a microprocessor because of the need to attach that microprocessor to a cassette or holder of some kind. An RF tag can readily be implemented in the supply itself by sticking onto inside of media supply roll.

Because the link is contactless, there is no risk of information loss due to poor electrical contacts. Moreover, an RF tag is passive, in that it does not request an onboard power supply. The reader does not need to be located in a particularly precise location in the printing apparatus, and, as described in the following, can read more than one tag. An RF tag is robust and durable.

The use of an RF tag also has advantages over existing optical system because it allows variable information to be written back to the supply and also allows a high density of information to be included.

The printing apparatus can include tape usage monitoring means for monitoring usage of the image receiving tape as images are printed. This can be done by providing markings on the rear of the tape in combination with an optical reader on the printing apparatus, or by measuring encoder pulses on the shaft of a motor associated with the tape spool.

In the described embodiment, the status information includes the amount of image receiving tape remaining, and it is updated in dependence on the output of the tape usage monitoring means. Thus, the length of the tape which has been used is identified, regardless of the number of labels which have been produced. This is because the length of a label can vary in accordance with the requirements of a user.

The printing apparatus can comprise a display adapted to display said status information and/or said parameter information. The printing apparatus can also include a cutting system arranged to cut off a portion of the image receiving tape, the cutting system being controllable responsive to said parameter information.

The consumable can comprise a cassette holding a supply of image receiving tape, a tape holder around which is wound a supply of image receiving tape or a supply of image receiving tape itself. It can further be a supply of thermal transfer ribbon.

A further aspect of the invention provides a printing apparatus using a consumable providing an image receiving tape, the consumable carrying a tag holding parameter information identifying at least one template suitable for printing a label on the image receiving tape, the printing apparatus comprising: printing means for printing an image; a tag reader arranged to receive said template information from the tag via a contactless link in the form of electromagnetic waves; and a processor arranged to receive said template information and to control operation of the printing apparatus to print a label in accordance with said at least one template.

A still further aspect provides a consumable providing an image receiving tape and carrying a tag holding parameter information identifying at least one template for printing a label on the tape, the tag being arranged to transmit information via a contactless link in the form of electromagnetic waves.

A still further aspect provides a printing apparatus using a consumable providing a thermal transfer material and carrying a tag holding parameter information identifying the nature of the thermal transfer material, the printing apparatus comprising: printing means for printing an image; rewind means for winding the thermal transfer material after use; a tag reader arranged to receive said information from the tag via a contactless link in the form of electromagnetic waves; and a processor arranged to receive said parameter information and to control the torque value with which the rewind means rewinds the thermal transfer material in dependence on said information.

A still further aspect provides a consumable providing a thermal transfer material and carrying a tag holding parameter information so as to control the torque value with which the material is wound up in a printer, the consumable having a transmitter for transmitting the information via a contactless link in the form of electromagnetic waves.

A still further aspect provides a printing apparatus using a consumable providing a substrate carrying a plurality of preformed labels, the consumable carrying a tag holding information relating to the printable area of each of the predefined labels, the printing apparatus comprising: printing means for printing an image; a tag reader arranged to receive said information from the tag via a contactless link in the form of electromagnetic waves; and a processor arranged to receive said information and to control operation of the printing apparatus in dependence thereon.

A still further aspect provides a consumable providing a substrate carrying a plurality of preformed labels, the consumable having a tag holding information identifying the printable area of each preformed label and a transmitter for transmitting said information via a contactless link in the form of electromagnetic waves.

A still further aspect provides a printing apparatus using a consumable providing at least one of an image receiving substrate and a thermal transfer material, the consumable carrying a tag holding prestored messages relating to the consumable, the printing apparatus comprising: printing means for printing an image; a tag reader arranged to receive said prestored messages from the tag via a contactless link in the form of electromagnetic waves; and a display arranged to display said prestored messages.

A still further aspect provides a consumable providing at least one of an image receiving substrate and a thermal transfer material, the consumable carrying a tag holding prestored messages relating to the consumable and having a transmitter for transmitting said prestored messages via a contactless link in the form of electromagnetic waves, whereby said prestored messages can be displayed at a printing apparatus.

Other objects, features, and advantages of the present invention will become apparent from the following detailed description, the accompanying drawings, and the appended claims.

BRIEF DESCRIPTION OF THE DRAWINGS

For a better understanding of the present invention and to show how the same may be carried into effect, reference will now be made by way of example to the accompanying drawings, in which.

DETAILED DESCRIPTION OF THE ILLUSTRATED EMBODIMENTS

Figure 1:
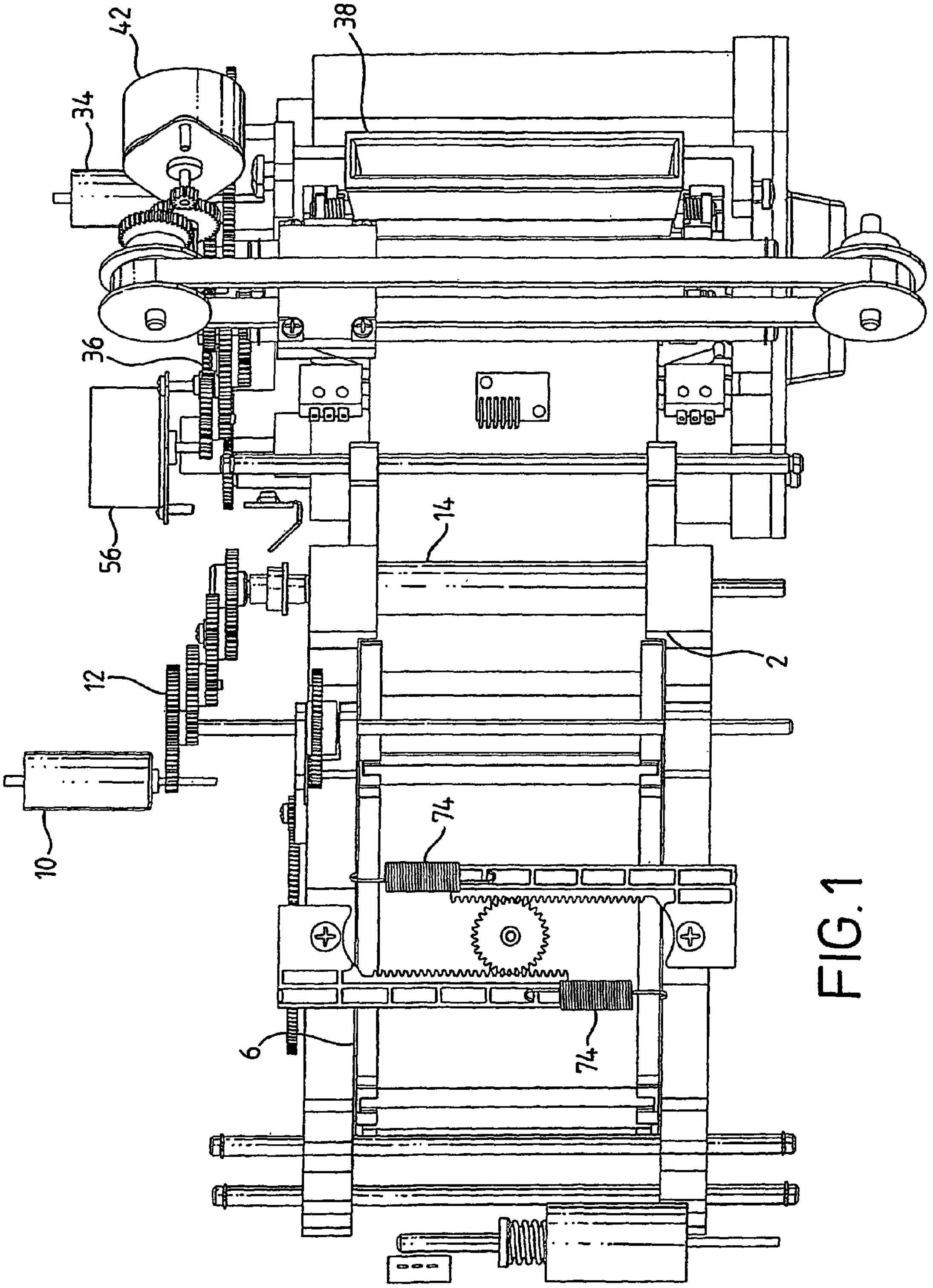
FIG. 1 is a plan view of the mechanical arrangement of a printing apparatus.
Figure 2:
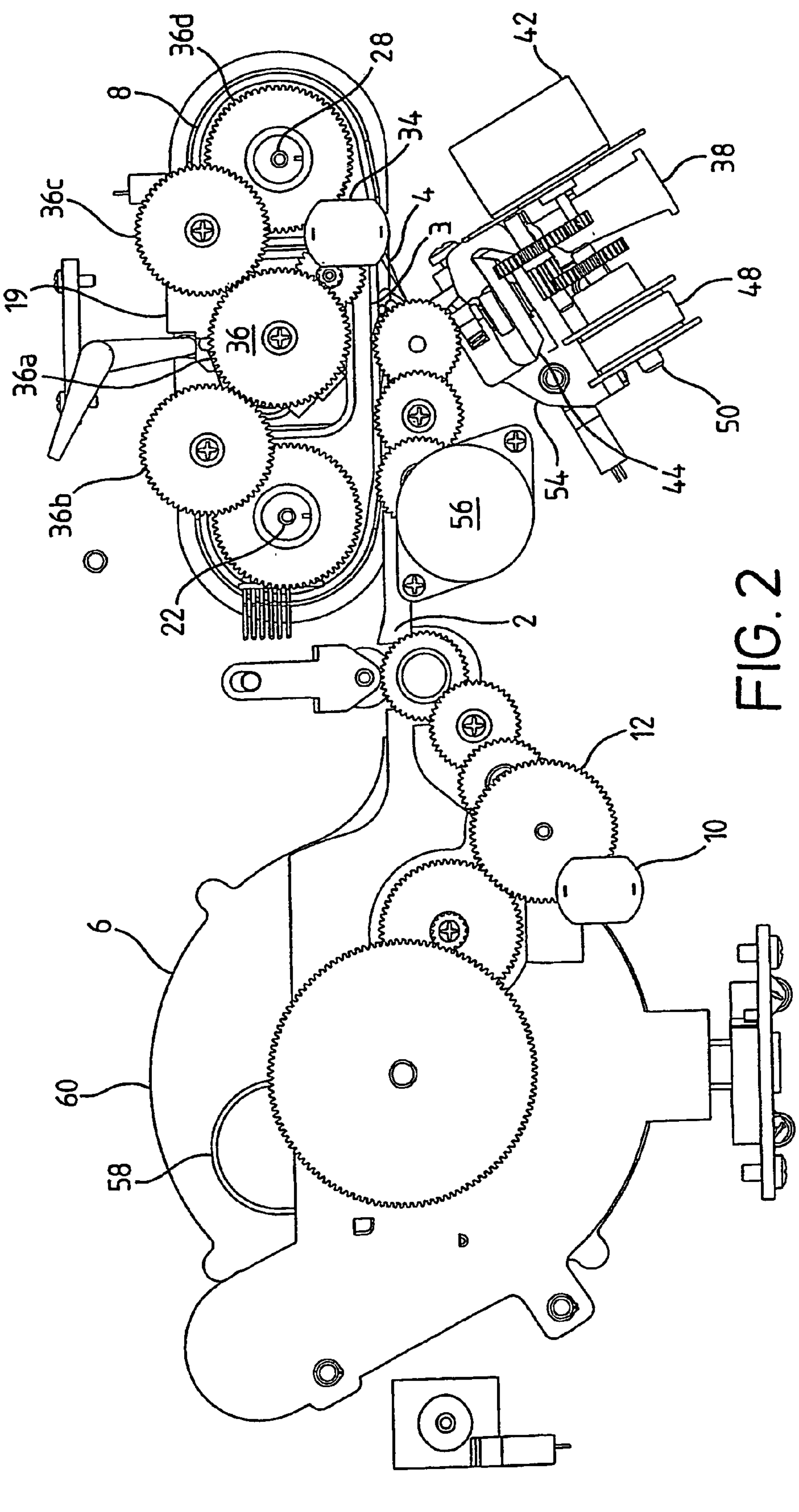
FIG. 2 is a side view of the mechanical arrangement of the printing apparatus.
Figure 3:
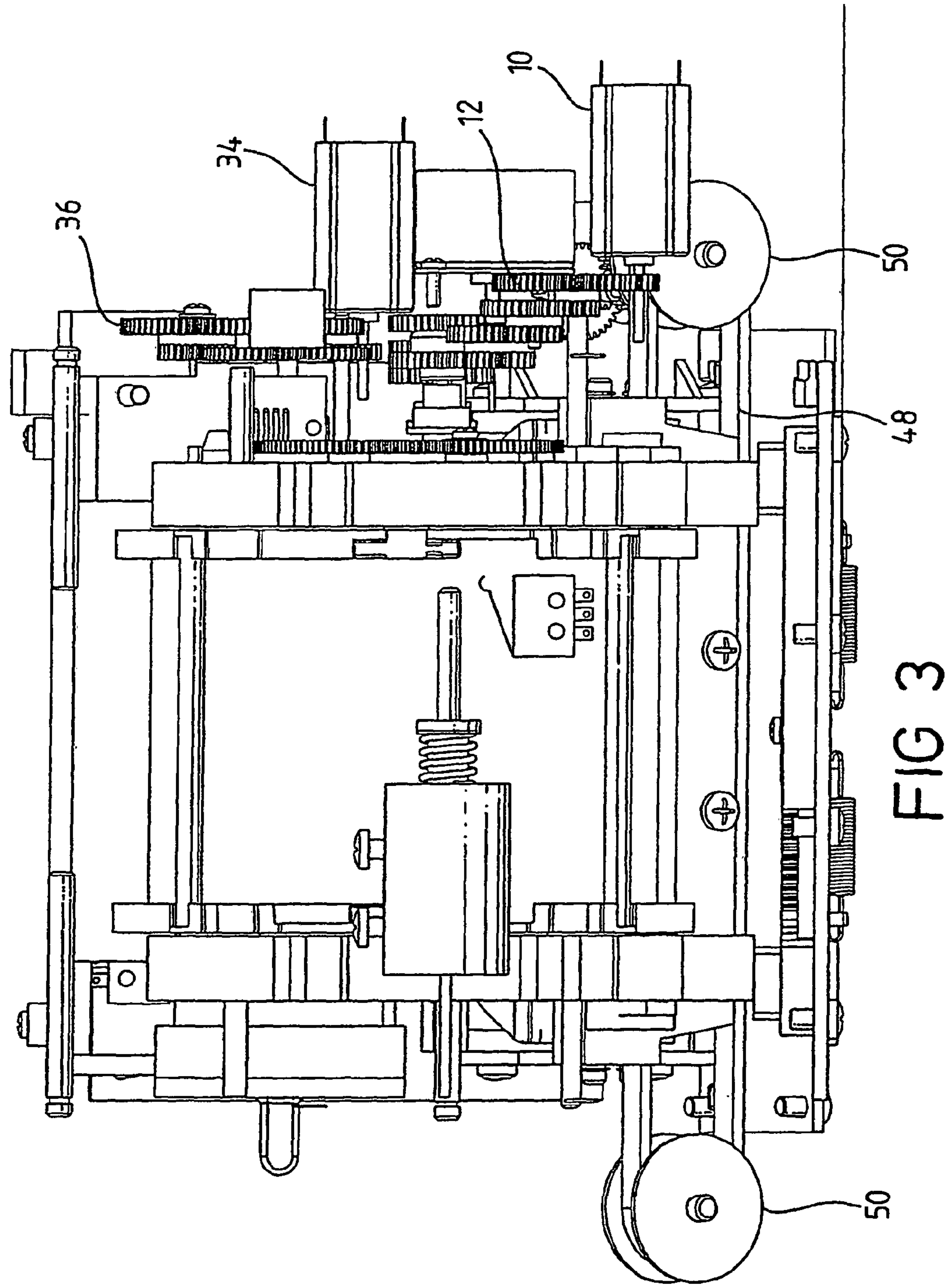
FIG. 3 is a front view of the mechanical arrangement of the printing apparatus.
Figure 4:
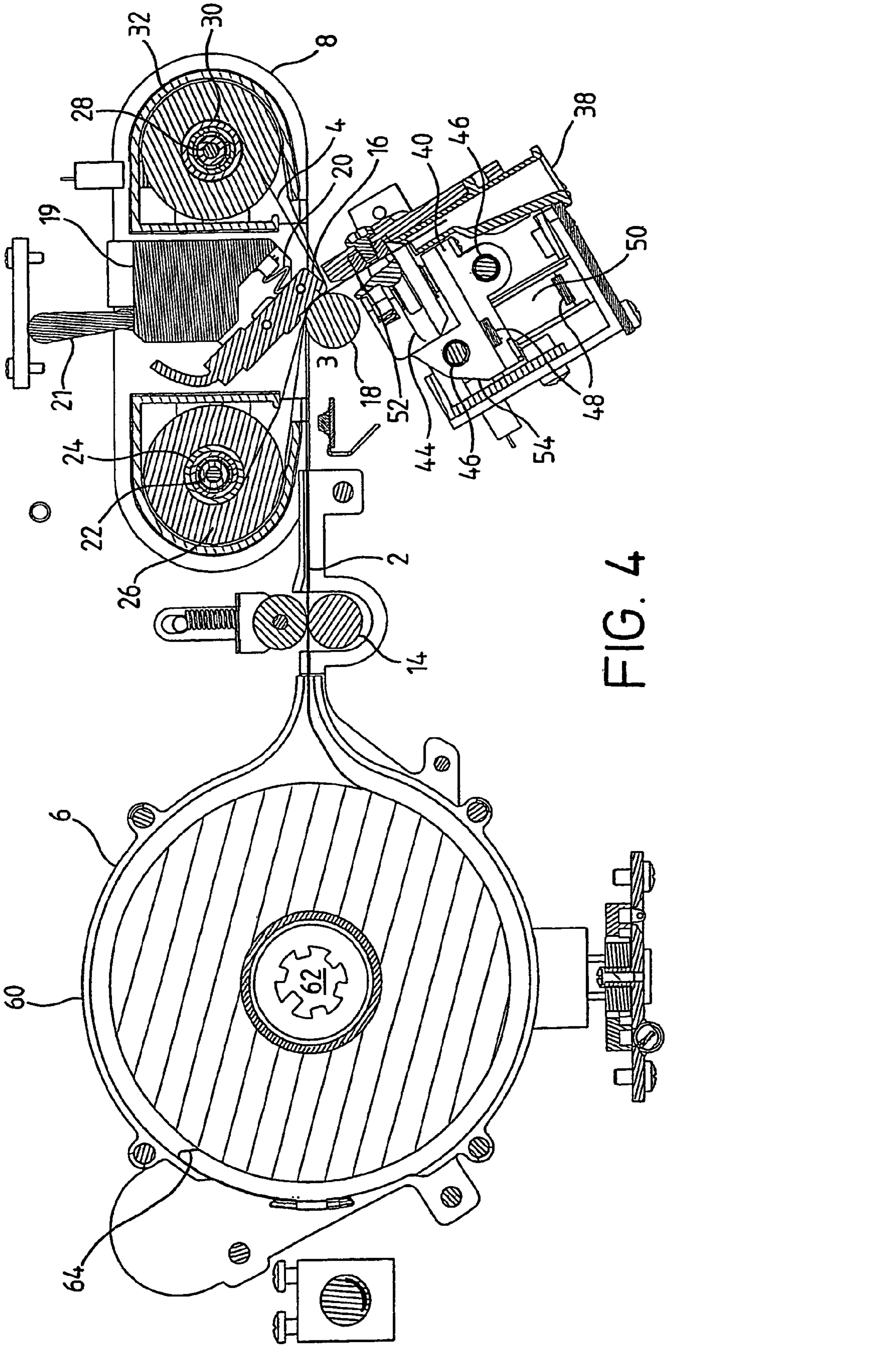
FIG. 4 is a cross-sectional view of the mechanical arrangement of the printing apparatus taken along line AA of FIG. 1.
Figure 4A:
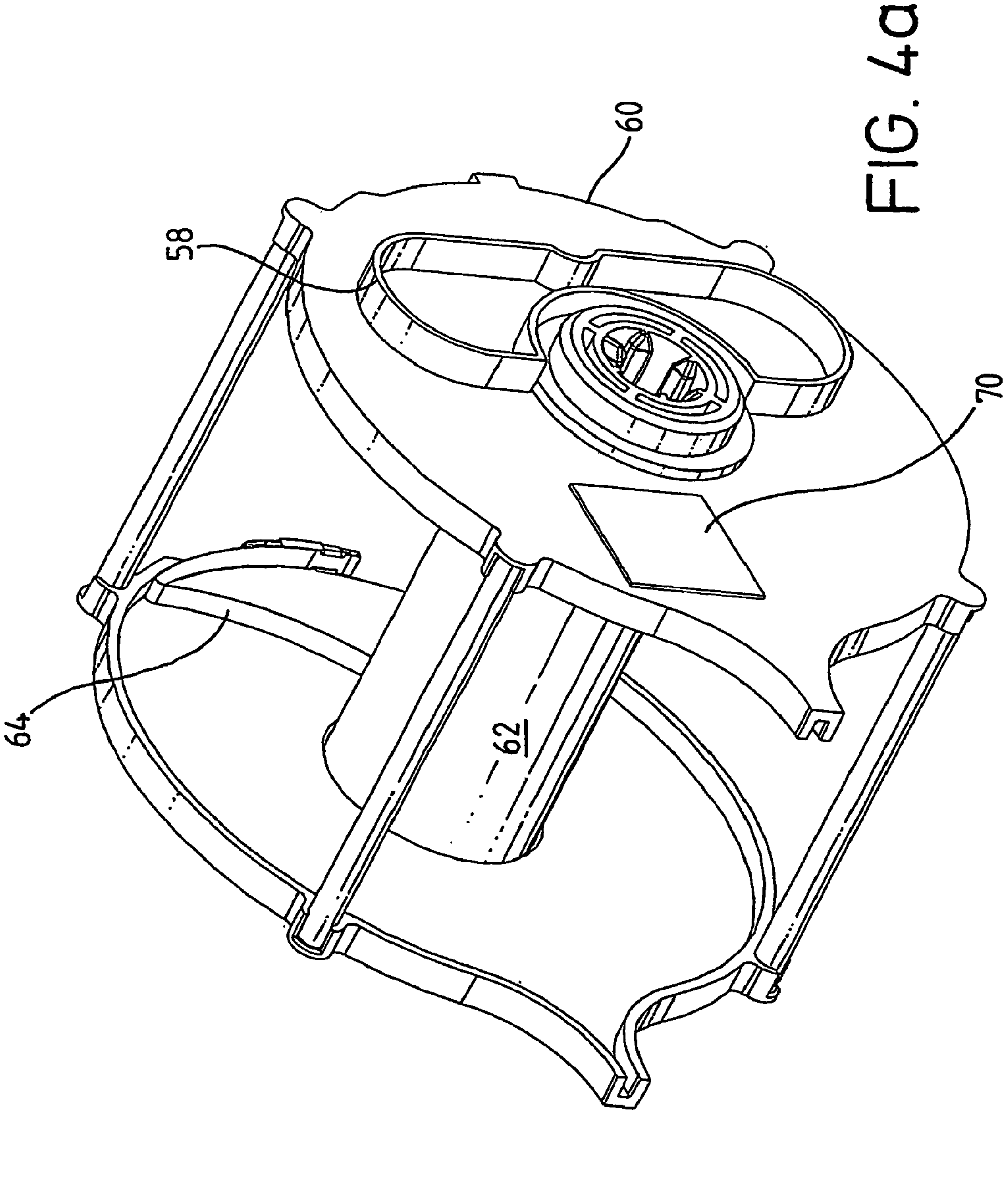
FIGS. 4A and 4B are perspective views from different angles of a tape holder, Figure C is a perspective view of a tape holder housed in a receiving part of the printing apparatus
Figure 4B:
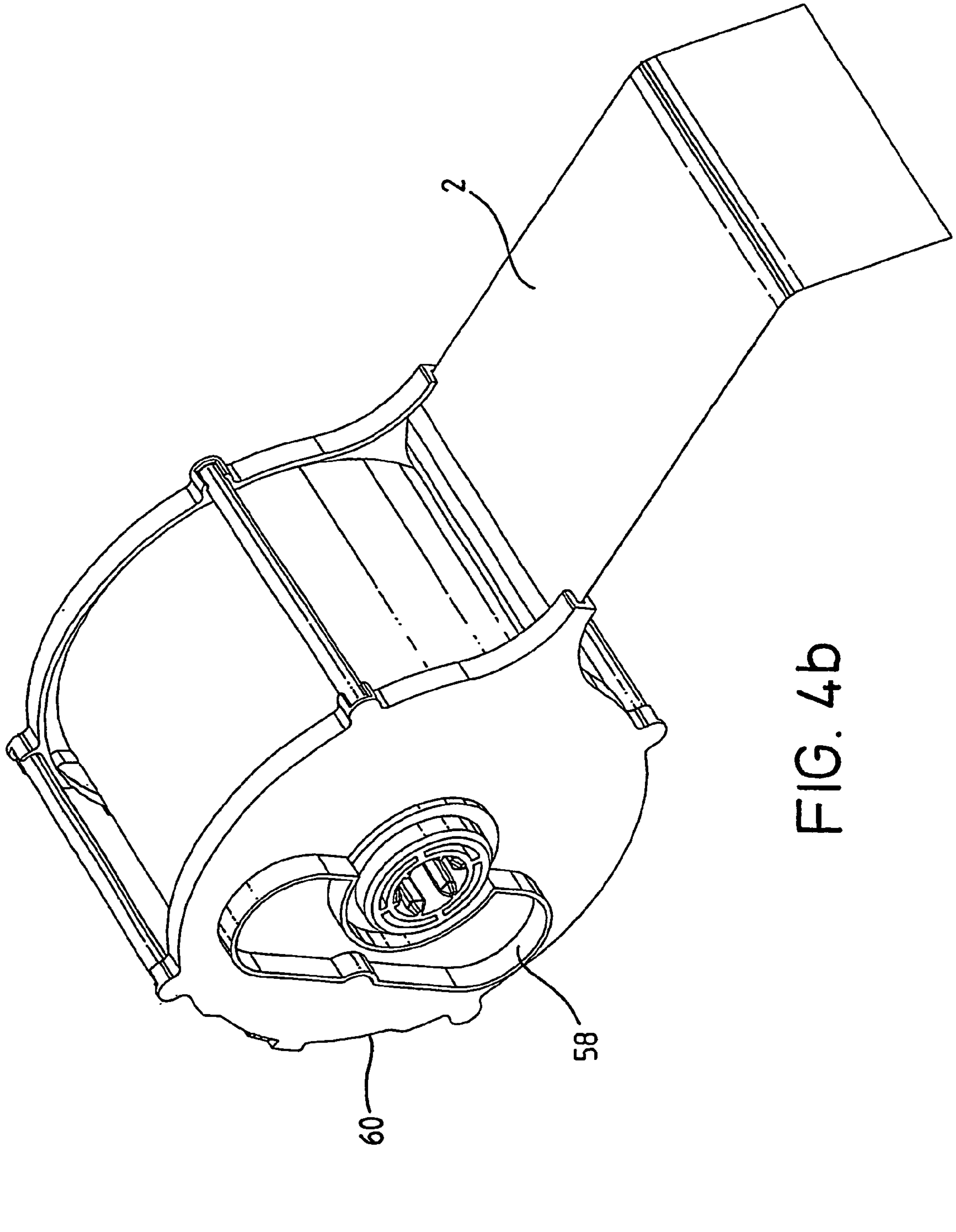

The mechanical arrangement of the printing apparatus will now be described with reference to FIGS. 1 to 4. A label substrate comprises a tape 2 onto which images can be printed by a printing apparatus into which the label substrate is inserted. The tape 2 is housed on a tape holder 6, the details of which can most clearly be seen from FIGS. 4, 4*a* and 4*b*. The tape holder 6 comprises sides 60 and an inner spool 62 around which a supply of tape 2 is wound. The inner spool 62 may rotate within the tape holder 6 when tape is unwound. A spring clip 64 is attached to a flange on the tape holder and bears on the spool 62. The spring clip 64 prevents the tape from unwinding more than is required. An annular rib 58 is provided on each side of the tape holder 6 which allow it to be housed in a first receiving part 66 of the printing apparatus.

Figure 4C:
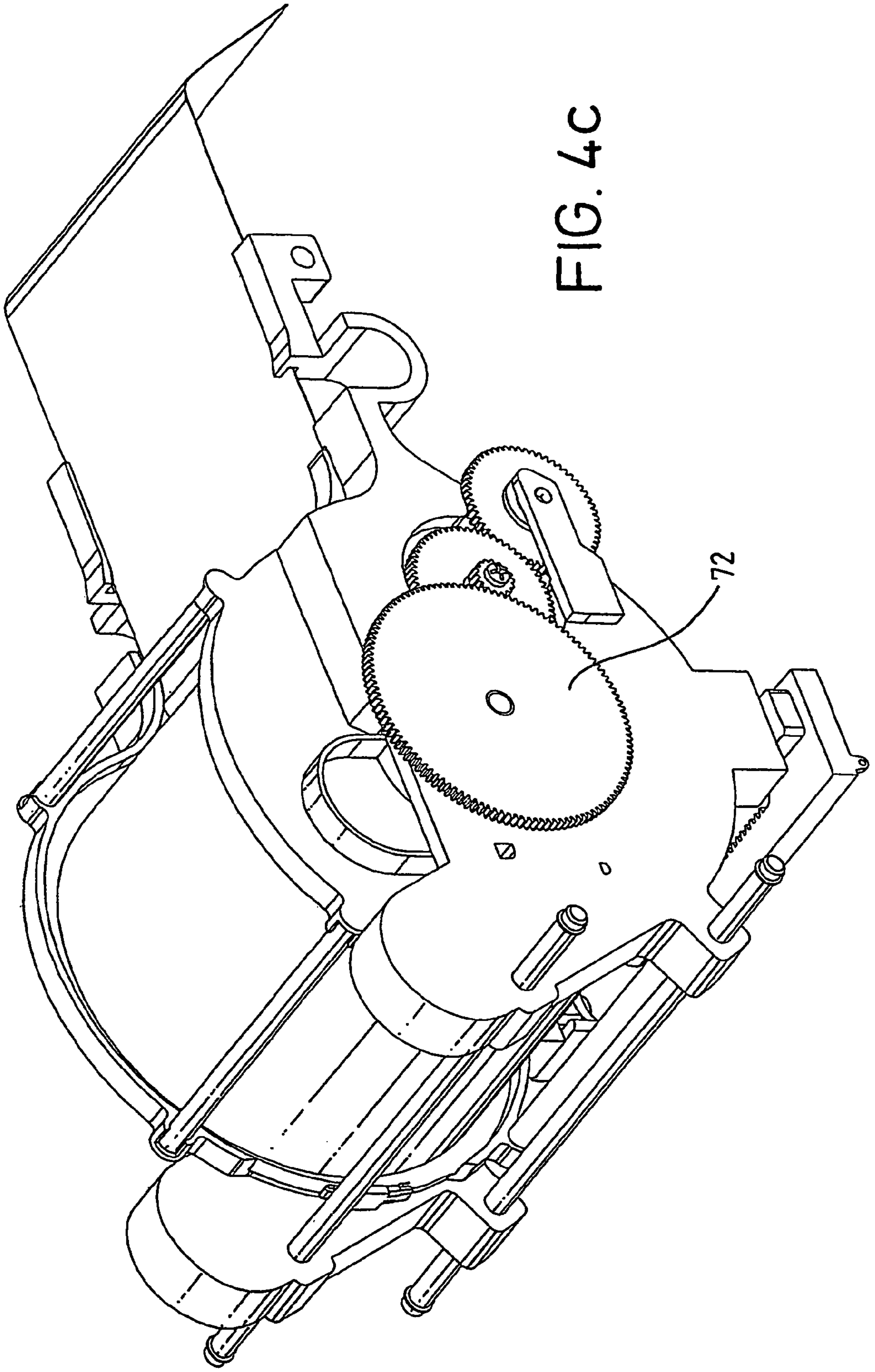
FIG. 4D is a perspective view of the receiving part of the printing apparatus without the tape holder installed.
Figure 4D:
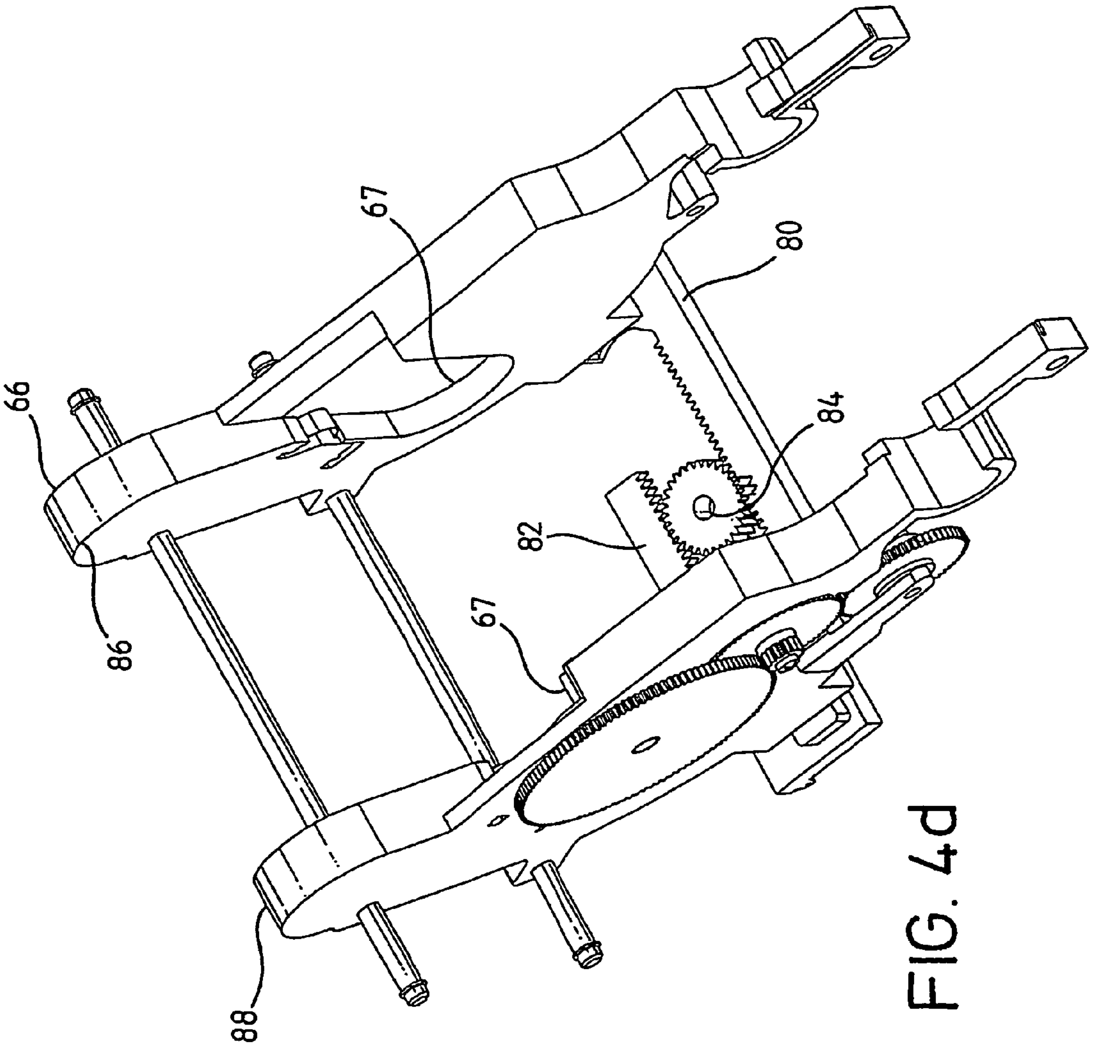

The first receiving part 66 is shown in FIG. 4D, and has side supports 86, 88 each having an inward facing recess 67 designed to accept the corresponding rib 58 of the tape holder 6. The first receiving part 66 is adjustable to accommodate different width holders as will now be explained. The supports 86 and 88 of the first receiving part 66 are connected to teethed arms 80 and 82. The teeth of teethed arms 80 and 82 engage with opposite edges of a cog 84. In this way any movement of one of the supports 86 or 88 is mirrored by the other support, so that each support is always an equal distance from a centre line A (shown in FIG. 1). This ensures that the tape will always be fed centrally to the print head, regardless of the width of the tape. The supports can be separated by a user to insert a holder, and then springs 74 (shown in FIG. 1) bring the supports together to grip the sides of the of the tape holder 6.

As shown in FIG. 4C, the receiving part 66 is provided with a gear chain 71 powered by a motor 10 (shown in FIG. 1) that drives the inner spool 62 of the tape holder in order to rewind the tape to allow the holder to be removed from the device.

The printing apparatus comprises a gear chain 12, powered by a motor 10, which drives the feed roller 14 which causes the tape from the tape holder 6 to move towards a print zone 3 of the printing apparatus. At the print zone, a print head 16 is biased against a platen roller 18 by a spring 20. The spring 20 is held within a print head mounting block 19.

Figure 8:
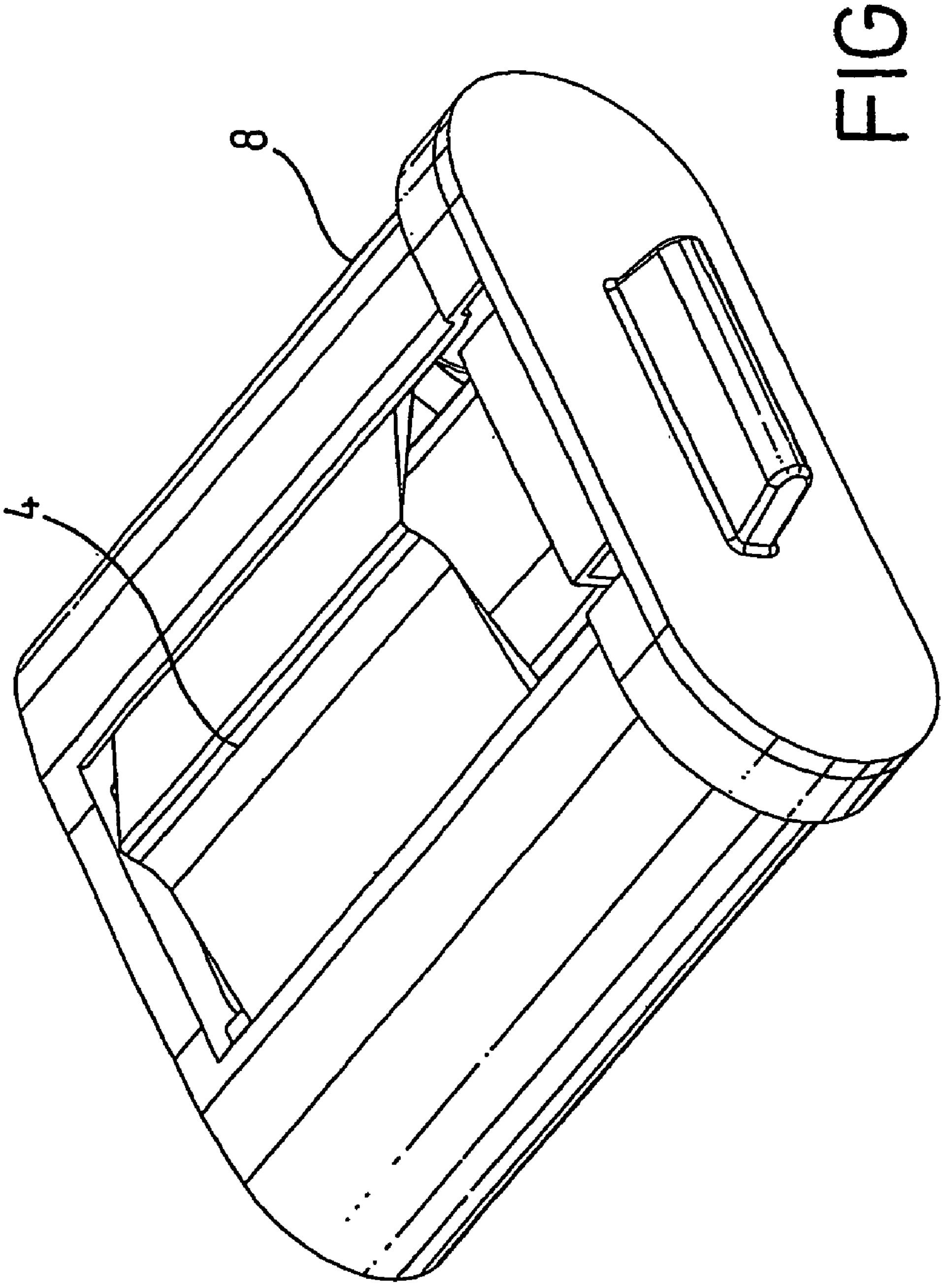
FIG. 8 is a perspective view of a ink ribbon cassette.

An ink ribbon cassette 8 (shown in FIG. 8) holds an ink ribbon 4 and is similarly mounted in a second receiving part of the printing apparatus. It is mounted on shafts 22 and 28 of the printing apparatus. The mounting block 19 may be moved by means of an actuator 21 to separate the print head and the platen to allow the ink ribbon cassette 8 to be removed from the printer. Unused ink ribbon 26 is stored on a supply reel 24 mounted on a shaft 22. Used ink ribbon 32 is stored on a take-up reel 30 mounted on a shaft 28. A motor 34 powers a gear chain 36. When the motor 34 is driving forwards, a first set of gears 36*c*, 36*d* drive the shaft 28 to pull the ink ribbon 4 in a forward direction from the supply reel 24 to the take-up reel 30, and a slipping clutch (not shown) disengages the shaft 22 so that it is not driven, but is free to turn. When the motor 34 drives in reverse, a second set of gears 36*a*, 36*b* drive the shaft 22 to pull the ink ribbon 4 in a reverse direction from the take-up reel to the supply reel, and a slipping clutch (not shown) disengages the shaft 28 so that it is not driven, but is free to turn.

The ink ribbon cassette 8 is located in the printing apparatus so that the ink ribbon 4 has a path which extends through the print zone 3, and in particular extends in overlap with the tape 2 between the printhead 16 and the platen 18. The platen 18 is driven by a platen motor 56, to drive the tape through the print zone.

A cutting apparatus 40 is located downstream of the print zone 3. The cutting apparatus comprises a circular cutting blade or cutting wheel 44 mounted on a cutter holder 54. The cutting blade 44 cuts the tape 2 against an anvil 52. A cutter motor 42 drives the cutting wheel 44 from a rest position across the width of the tape. Once the cutting wheel 44 has traversed the entire width of the tape, the cutter motor 42 is reversed and drives the cutter holder 54 back to its rest position. The cutter holder 54 is slidably mounted on two sliders 46 which span the entire width of the tape 2. The cutter holder 54 is attached to a belt 48 which is supported by two rollers 50. One of the rollers 50 is driven by the cutter motor 42 to cause the cutter holder to move along the sliders 46.

The mechanical function of the printing apparatus will now be described. During feeding of the tape, the tape feed motor 10 is activated to drive the tape 2 past the printhead 16. Once the tape reaches the print zone, it is picked up by the platen 18, driven by the platen motor 56. At the same time, the ink ribbon motor 34 is activated to drive the ink ribbon at an equal speed to the tape. An image is transferred onto the image receiving tape 2 by virtue of activation (heating) of particular printhead elements to transfer ink from the ink ribbon 4 to the substrate 2 in a known manner. Images are printed on a column by column basis as the tape 2 is moved past the printhead 16. This printing technique is known per se and so is not described further herein.

When the printing on a label is finished, the platen motor 56 and the ink ribbon motor 34 continue to feed the tape and the ink ribbon a predetermined distance until the end of the label is at the required cutting position. The tape may then be cut by the cutting apparatus 40. Once cutting is complete, the tape 2 is reversed by reversing the platen motor 56 that drives the platen 18 in reverse until the tape 2 is in the correct position for printing the next label. Whilst the tape is reversed, the ink ribbon 4 is also reversed at the same speed by driving the ink ribbon motor 34 in reverse. This prevents the ink ribbon 4 rubbing against the tape 2 and becoming damaged.

Figure 9:
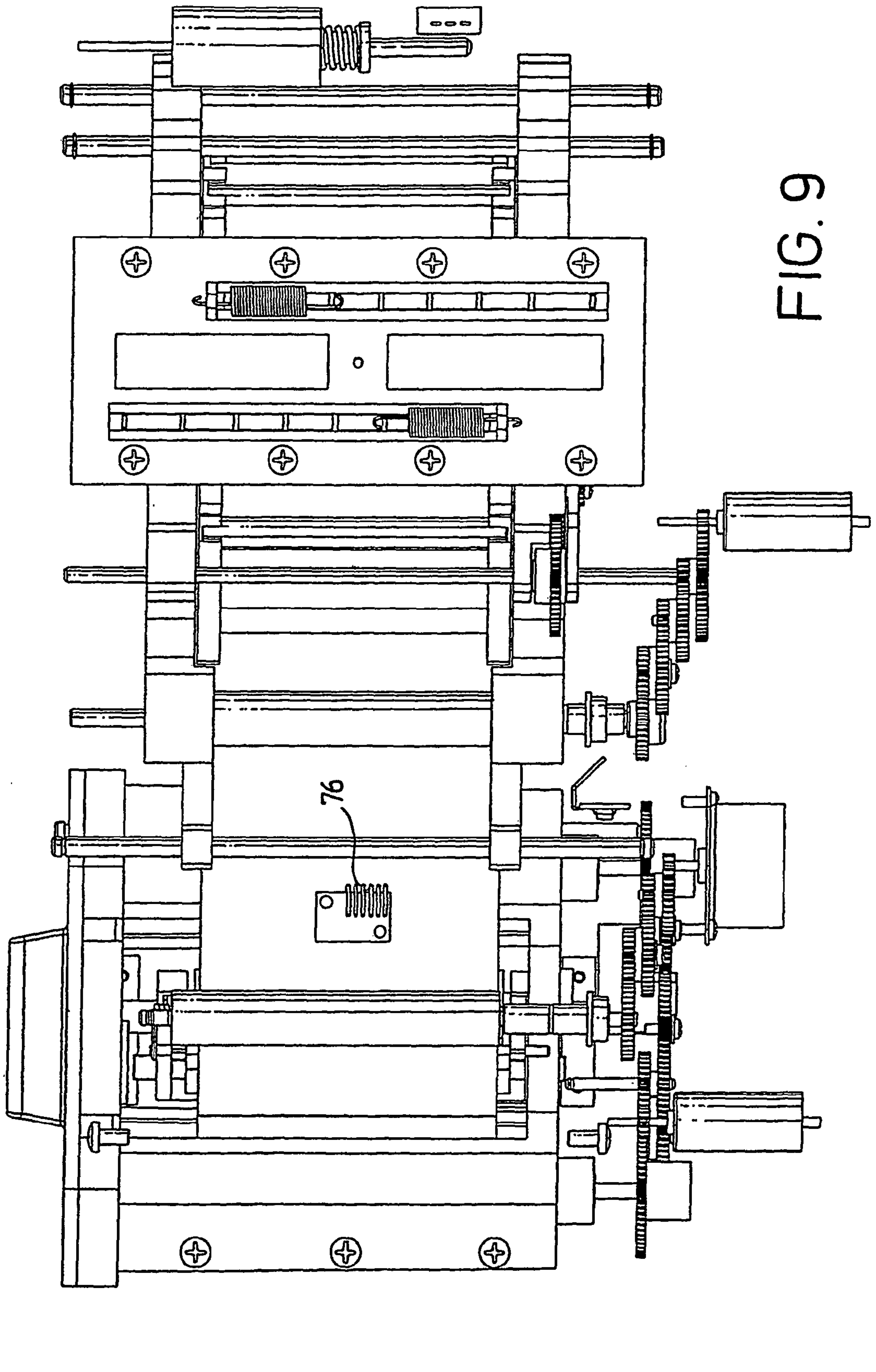
FIG. 9 is a plan view of the printing apparatus showing a photo-sensor.

A photo-sensor 76 shown in FIG. 9 is mounted on the frame of the printing apparatus and detects the presence of tape 2. This prevents the printer printing if there is no tape present in the printer.

Figure 5:
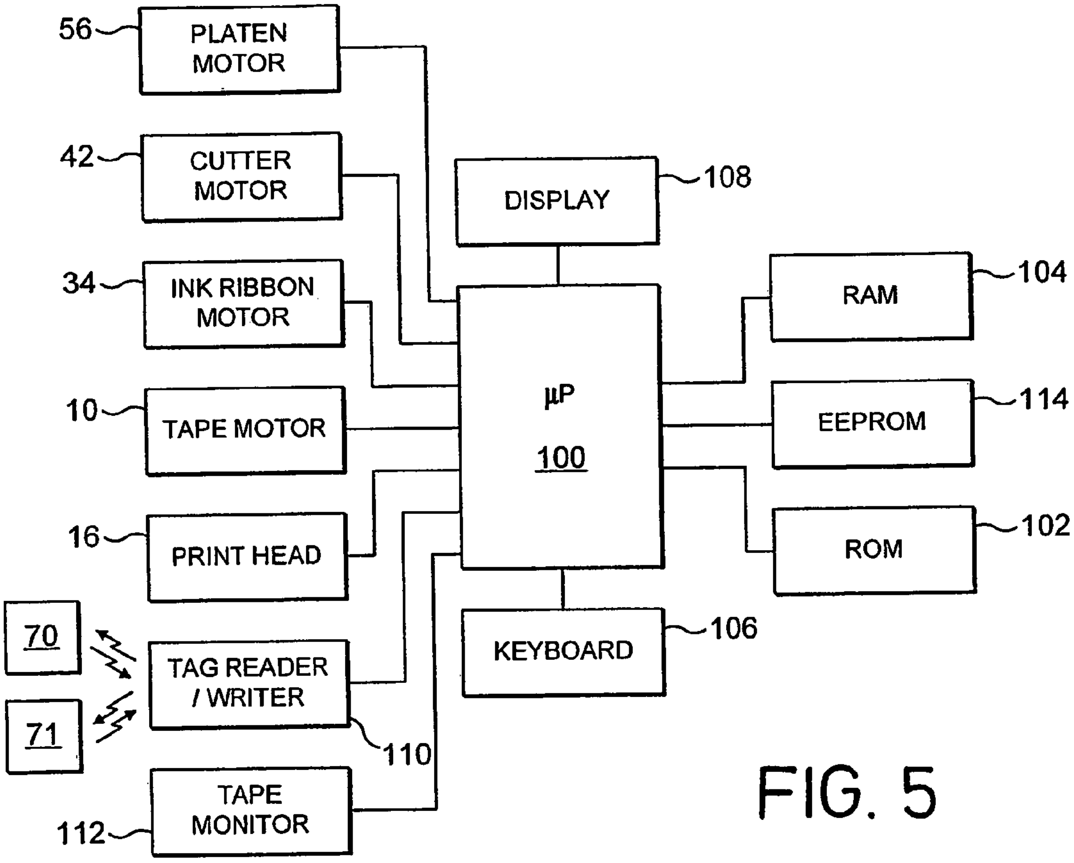
FIG. 5 is a schematic block diagram of control components of a printing apparatus.

FIG. 5 shows a schematic block diagram of the control components of the printing apparatus. A microprocessor 100 controls operation of the printing apparatus and is associated with a read only memory ROM 102, an electronically erasable programmable read only memory EEPROM 114 and a random access memory RAM 104. The printing apparatus includes a keyboard 106 for entering data (e.g. characters and symbols) and control commands for printing, and a display 108 for displaying to the user labels under edit, control commands, error messages, etc. The microprocessor 100 controls the printhead 16, tape drive motor 10, ink ribbon motor 34, cutter motor 42 and the platen motor 56.

A tape monitor 112 monitors usage of the tape. In order to monitor usage of the tape in one implementation, the rear of the substrate tape may be provided with markings indicative of the amount of tape remaining. For example, alternating black/white spaces (stripes perpendicular to the lengthwise direction of the tape) could be provided where the ratio of black to white, or the absolute width of the spaces, varies from the beginning to the end of the tape. This could be a continuous change or discrete change, in the latter case for example changing every quarter of the tape only to provide a rough indication of how much tape is left. Another possibility would be a line extending diagonally along the entire length of the tape such that at any point the distance of the line from an edge of the tape differs. In that case, the tape monitor can comprise a reader for reading these markings. A suitable reading device is described for example in our U.S. patent application Ser. No. 09/284,236 (now issued as U.S. Pat. No. 6,380,965) and suitable markings for usage indication are described in our U.S. patent application Ser. No. 09/014,059, each of which is incorporated herein by reference.

A further alternative is to provide an end of tape detection, for example by providing silvering at the end of the substrate tape 2, which can be optically detected by the printing apparatus. Other end of tape detection means are know, for example using the encoded pulses from a feed motor shaft to sense if the shaft has stopped turning, due to reaching the end of the tape.

Usage of the ink ribbon in the ink ribbon cassette can be monitored in a known way, for example, as described in U.S. Pat. No. 5,821,975, which is incorporated herein by reference.

A tag reader/writer 110 is also provided in the printing apparatus. The purpose of this reader is to read information from and write information to RF tags on the tape holder 6 and ink ribbon cassette 8 in the printing apparatus. Each tape holder 6 or ink ribbon cassette 8 manufactured for use with a printing apparatus of the type described herein carries initial status information and parameter information relating to that particular tape holder or ink ribbon cassette and their contents. In the described embodiment, this is carried on an RF tag 70 on the tape holder 6 and the RF tag 71 on the ink ribbon cassette 8.

Figure 6:
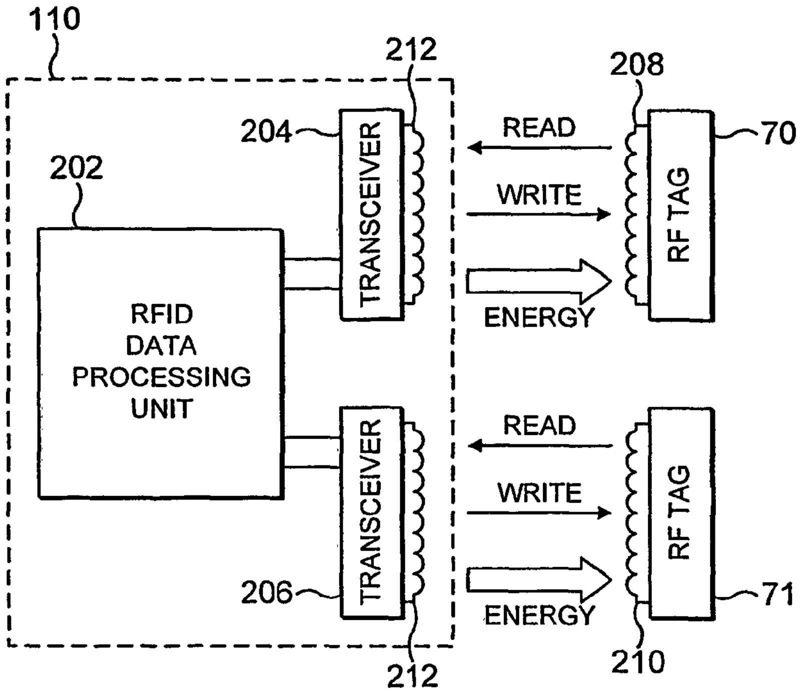
FIG. 6 is a diagram of a tag reader.

The tag reader/writer 110 is shown in more detail in FIG. 6. The reader/writer takes the form of an RFID data processing unit 202 that controls transceivers 204 and 206. A transceiver 204 communicates via an RF coil 212 with a coil 208 implemented at the tag 70 mounted on the tape holder 6, by way of electromagnetic radio frequency waves. A transceiver 206 communicates via an RF coil with a coil 210 implemented at the tag 71 mounted on the ink ribbon cassette 8. The signal communicated is encoded in a known way by modulating an RF carrier. The RF tags 70, 71 are passive devices that receive energy from the tag reader/writer 110 whenever they are accessed.

The tag reader/writer 110 is located in the printer so that it can read the signal from or write information to the tags 70 and 71, even through they are not at the same location. The RFID DPU 202 switches between the transceivers 204, 206 depending on which tag is to be read or written to.

Figure 7:
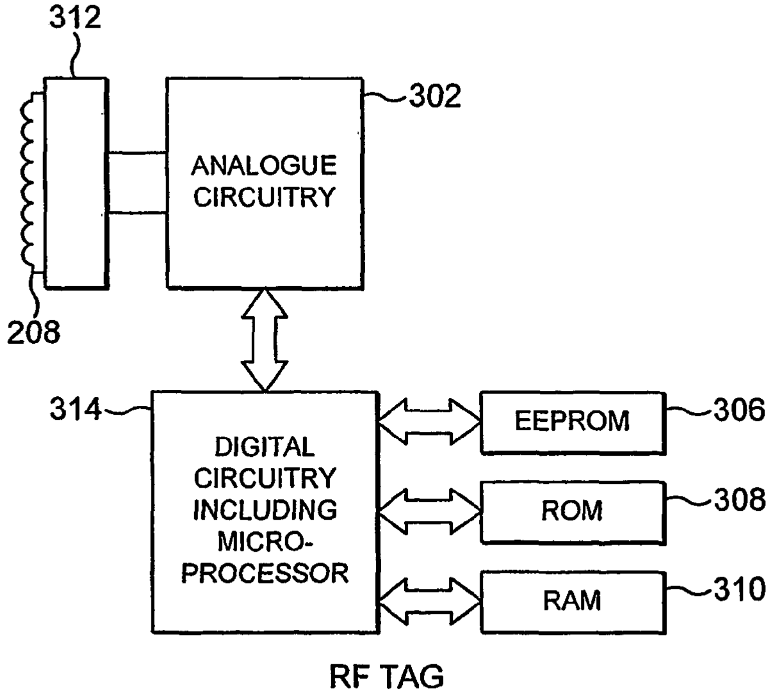
FIG. 7 is a diagram of an RF tag.

FIG. 7 shows a schematic of the RF tag 70. RF tag 71 is designed to work in a similar fashion. An RF coil 208 is provided to receive data signals and power from the tag reader/writer 110. The signals are received by digital circuitry 304, which includes a microprocessor, via analogue circuitry 302. The digital circuitry 304 has access to EEPROM 306, ROM 308 and RAM 310. During a read operation, the digital circuitry 314 can access information stored in the ROM 308, or stored in the EEPROM 306, in response to a request from the tag reader/writer 110. The information is transmitted to the tag reader/writer 110 via the analogue circuitry 302. Parameter information is programmed on the ROM 308 during fabrication. Initial status information is programmed onto the EEPROM 306 during fabrication, and then may be reprogrammed on the tag during use by performing a write operation. During a write operation the new status information is transmitted by the tag reader/writer 110 to the tag 70. This information overwrites existing information stored in the EEPROM 306, and is then accessible in future read operations by the tag reader/writer 110.

The parameter information includes for example the width of the supply and the material properties such as the colour, type of material, etc. The status information includes capacity information relating to the number of labels or meterage of tape. The initial capacity information can be stored at the time of production.

The parameter information is displayable on the display 108, either continuously or upon request. It could be displayed graphically or in an alphanumeric way. The parameter information can be used to control printing, for example if tape of a certain width is included, characters can be sized accordingly. The parameter information can also be used to alter mechanical parameters in the printer. For example, if a narrow tape is inserted the travel of the automatic cutter could be adjusted to reduce the cutting time. The cutter could be disabled for certain materials and/or the printhead pressure could be adjusted.

The status information is continuously updated as the image receiving tape is consumed. This is achieved by the tape usage monitor passing information to the microprocessor 100 which controls the tag reader/writer 110 to write back the information to the tag 70 after each printing operation is accomplished. The updated information can be displayed on a display, either continuously or upon request, either graphically or in an alphanumeric way. Before a batch printing operation is commenced (for example multiple copies of a particular label are requested by a user) a check can be made to see if sufficient tape is left and this information can be provided to a user. A similar technique can be used where a long label is requested—a check can be made before the printing operation is commenced to avoid that the user runs out of tape halfway through the printing of a long label.

The parameter information can include template information which identifies a format or template suitable for printing on the size of tape in the consumable. For example, a 24 mm tape cassette would have information about a certain set of printable templates which would differ from that for, for example 18 mm tape.

A list of available templates held in the tag can be displayed on the display to allow a user to select one.

In a situation where the consumable provides a thermal transfer material, the tag could contain further technical information like the torque value with which the ribbon is to be wound up in the printer.

The tag could also contain the width and height dimensions of die-cut labels in a die-cut consumable. For self-laminated tape, the tag could contain information about the printable area, that is the area that is not transparent.

User messages could be included in the tag which could be displayed on the printer's display. These user messages could be useful tips for a user, such as "tape X is ideal for application Y".

The foregoing detailed description has been provided solely to illustrate the structural and functional principles of the present invention, and is not intended to be limiting. To the contrary the present invention is intended to encompass all modifications, alterations, substitutions and equivalents within the spirit and scope of the following claims.

The invention claimed is:

1. A consumable comprising:

an image receiving tape; and a tag holding at least one set of templates, each template within the set comprising a format suitable for printing on the size of image receiving tape comprised in the consumable, the tag being arranged to transmit information associated with the at least one set of templates via a contactless link in the form of electromagnetic waves, thereby allowing the printer to print in accordance with the at least one set of templates stored on said tag.

2. A consumable according to claim 1, wherein the parameter information identifies the nature of the material.

3. A consumable according to claim 1, wherein the tag stores a prestored message for display at a printing apparatus.

4. A consumable according to claim 3, wherein the tag stores a prestored message to notify a user to order more tape when there is insufficient length of image receiving tape remaining for a printing operation.

5. A consumable comprising:

a substrate carrying a plurality of preformed labels and providing a plurality of printable areas on each preformed label; and a tag holding information identifying the plurality of printable areas of each preformed label; and a transmitter for transmitting said information via a contactless link in the form of electromagnetic waves, thereby allowing a printer to print in accordance with the plurality of printable areas of each preformed label.

6. A consumable according to claim 5, wherein the preformed labels are die-cut labels removably adhered to the substrate.

7. A consumable according to claim 5, which provides a self-laminated tape providing a plurality of non-transparent printable areas.

8. A consumable according to claim 5, wherein the printable area is defined by width and height information.

9. A consumable according to claim 5, wherein the tag stores a prestored message to notify a user to order more tape when there is insufficient length of image receiving tape remaining for a printing operation.

10. A consumable comprising:

a thermal transfer material;

a tag holding parameter information comprising a torque value with which the material is to be wound up in a printer, and a transmitter for transmitting the information via a contactless link in the form of electromagnetic waves, thereby allowing a processor arranged to receive said information to control the torque value with which the printer winds the thermal transfer material in dependence upon such information.

11. A consumable according to claim 10, wherein the tag stores a prestored message to notify a user to order more tape when there is insufficient length of image receiving tape remaining for a printing operation.

12. A consumable comprising:

an image receiving tape;

a tag holding a prestored message to notify a user to order more tape when there is insufficient length of image receiving tape remaining for a printing operation; and a transmitter for transmitting said prestored message via a contactless link in the form of electromagnetic waves, whereby said prestored message can be displayed at a printing apparatus.

13. A consumable according to claim 12, wherein the tag holds a message including dealer/sales contact information.

14. A consumable according to claim 12, wherein the tag holds a message selected from one of the group consisting of advertisements, application suggestions and other user oriented messages.

15. A consumable comprising:

a continuous supply of image receiving substrate which carries markings allowing tape usage to be monitored;

a tag holding status information identifying the length of image receiving tape remaining for receiving an image;

a transmitter for transmitting the information via a contactless link in the form of electromagnetic waves; and a receiver for updating the status information.

16. A consumable according to claim 15, wherein the tag stores a prestored message to notify a user to order more tape when there is insufficient length of image receiving tape remaining for a printing operation.

* * * * *